United States Patent [19]
Mickelson

[11] Patent Number: 6,022,473
[45] Date of Patent: Feb. 8, 2000

[54] OIL CHANGING SYSTEM

[76] Inventor: Doug Mickelson, 7009 Sunnyside St., Fargo, N. Dak. 58104-5309

[21] Appl. No.: 09/110,801

[22] Filed: Jul. 6, 1998

[51] Int. Cl.[7] .............................. B01D 17/12; F16N 7/38; F16N 31/00
[52] U.S. Cl. ................................ 210/86; 184/1.5; 210/94; 210/257.1; 210/258; 210/416.4; 222/189.06; 222/383.1; 222/158; 141/98
[58] Field of Search ..................... 222/154–158, 222/189.06, 251, 255, 282, 333, 372, 373, 383.1, 383.2; 210/86, 94, 95, 96.1, 248, 257.1, 258, 335, 416.4; 184/1.5, 106; 141/98; 123/196 A, 196 R

[56] References Cited

U.S. PATENT DOCUMENTS

| | | | |
|---|---|---|---|
| 1,366,862 | 1/1921 | Berry | 222/157 |
| 1,380,590 | 6/1921 | Price et al. | 222/158 |
| 1,412,780 | 4/1922 | Dix | 222/154 |
| 1,527,204 | 2/1925 | McCormick | 222/158 |
| 1,925,248 | 9/1933 | Hall | 222/158 |
| 3,355,026 | 11/1967 | Schut | 210/416.1 |
| 3,938,621 | 2/1976 | Bobbitt | 184/1.5 |
| 4,987,973 | 1/1991 | Cody | 184/1.5 |
| 5,062,500 | 11/1991 | Miller et al. | 184/106 |
| 5,228,985 | 7/1993 | Wells et al. | 210/167 |
| 5,340,471 | 8/1994 | Wilson et al. | 210/167 |
| 5,395,514 | 3/1995 | Siegler | 210/85 |
| 5,435,413 | 7/1995 | Schoenborn | 184/1.5 |
| 5,477,897 | 12/1995 | Scofield | 184/1.5 |
| 5,562,181 | 10/1996 | Elkin et al. | 184/1.5 |
| 5,626,770 | 5/1997 | Pacosz | 210/799 |
| 5,845,684 | 12/1998 | Fletcher et al. | 141/98 |
| 5,900,155 | 5/1999 | Bedi | 210/96.1 |

*Primary Examiner*—Joseph W. Drodge

[57] ABSTRACT

An oil changing system that utilizes one oil pump for draining contaminated oil from a vehicle and pumping clean oil into the vehicle without contamination. The inventive device includes a tank, a pair of wheels attached to the tank, a motor connected to a pump, a pair of couplers attached to opposing sides of the pump, a first filter and a second filter, a volume indicia attached to the side of the tank, a cavity within the tank which contains a light, and a drain pan fluidly connectable to the pump by a drain hose. The user positions the drain pan below the oil drain spout of the engine to receive the contaminated oil. The contaminated oil that is received by the drain pan is then drawn by the pump through the drain hose where after the contaminated oil is dispersed through an exhaust hose. The exhaust hose may be connected to a pipe system within a building structure to drain the contaminated oil into a common reservoir.

10 Claims, 4 Drawing Sheets

OIL CHANGING SYSTEM

BACKGROUND OF THE INVENTION

1. Field of the Invention

The present invention relates generally to vehicle fluid changing devices and more specifically it relates to an oil changing system that utilizes one oil pump for draining contaminated oil from a vehicle and pumping clean oil into the vehicle without contamination.

2. Description of the Prior Art

Vehicle fluid changing devices have been in use for years. Typically, an individual drains contaminated oil from a vehicle, such as a tractor, into a drain pan or bucket. The individual then has to manually carry the drain pan or bucket to a contaminated oil storage area where the contaminated oil is stored until it can be properly disposed of. The individual then has to either manually pump the clean oil into vehicle or manipulate large oil containers to fill the vehicle with oil.

Conventional methods of draining contaminated oil is extremely messy, time consuming and physically demanding. Additionally, filling the vehicle with clean oil can take an undesirable period of time and spillage typically occurs even when utilizing funnels. Hence, there is a need for an inexpensive compact system that can change the oil in a vehicle. Also, none of the prior art inventions discloses a convenient method of determining the amount of liquid remaining within the tank.

Examples of vehicle fluid changing devices include U.S. Pat. No. 5,626,770 to Pacosz; U.S. Pat. No. 5,395,514 to Siegler; U.S. Pat. No. 5,062,500 to Miller et al; U.S. Pat. No. 5,340,471 to Wilson et al; U.S. Pat. No. 3,355,026 to Schut; U.S. Pat. No. 5,228,985 to Wells et al; U.S. Pat. No. 4,987,973 to Cody; U.S. Pat. No. 3,938,621 to Bobbitt which are all illustrative of such prior art.

Pacosz (U.S. Pat. No. 5,626,770) discloses an apparatus and method for filtering used engine coolant. Pacosz teaches a tank which stores pre-filtered anti-freeze liquid received from a pre-filter for removing hydrocarbons carried within a drain pan positioned beneath a radiator in an automotive vehicle. However, Pacosz does not teach a system that utilizes one oil pump for draining contaminated oil from a vehicle and pumping clean oil into the vehicle without contamination.

Siegler (U.S. Pat. No. 5,395,514) discloses an ultrafiltration system and assembly. However, Siegler does not teach a system that utilizes one oil pump for draining contaminated oil from a vehicle and pumping clean oil into the vehicle without contamination.

While these devices may be suitable for the particular purpose to which they address, they are not as suitable for draining contaminated oil from a vehicle and pumping clean oil into the vehicle without contamination. None of the prior art inventions teach a compact system that utilizes one oil pump for draining contaminated oil from a vehicle and pumping clean oil into the vehicle without contamination. Additionally, none of the prior art inventions teaches a system for easily viewing the amount of liquid remaining within the tank to determine whether the proper amount of liquid has been dispersed.

In these respects, the oil changing system according to the present invention substantially departs from the conventional concepts and designs of the prior art, and in so doing provides an apparatus primarily developed for utilizing one oil pump for draining contaminated oil from a vehicle and pumping clean oil into the vehicle without contamination.

SUMMARY OF THE INVENTION

A primary object of the present invention is to provide an oil changing system that will overcome the shortcomings of the prior art devices.

Another object is to provide an oil changing system that is compact in size and easily portable.

An additional object is to provide an oil changing system that utilizes only one pump for drawing contaminated oil and pumping clean oil from and to an engine of vehicle.

A further object is to provide an oil changing system that reduces spillage during draining and filling of oil within an engine.

Another object is to provide an oil changing system that allows filtration of contaminated oil.

A further object is to provide an oil changing system that allows a user to visually see the level of liquid within a container regardless of the lighting conditions outside of the tank.

Another object is to provide an oil changing system that is portable to reduce the length of suction hose required.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying figures, in which like reference characters designate the same or similar parts throughout the several views, and wherein.

DESCRIPTION OF THE PREFERRED EMBODIMENT

Figure 1:
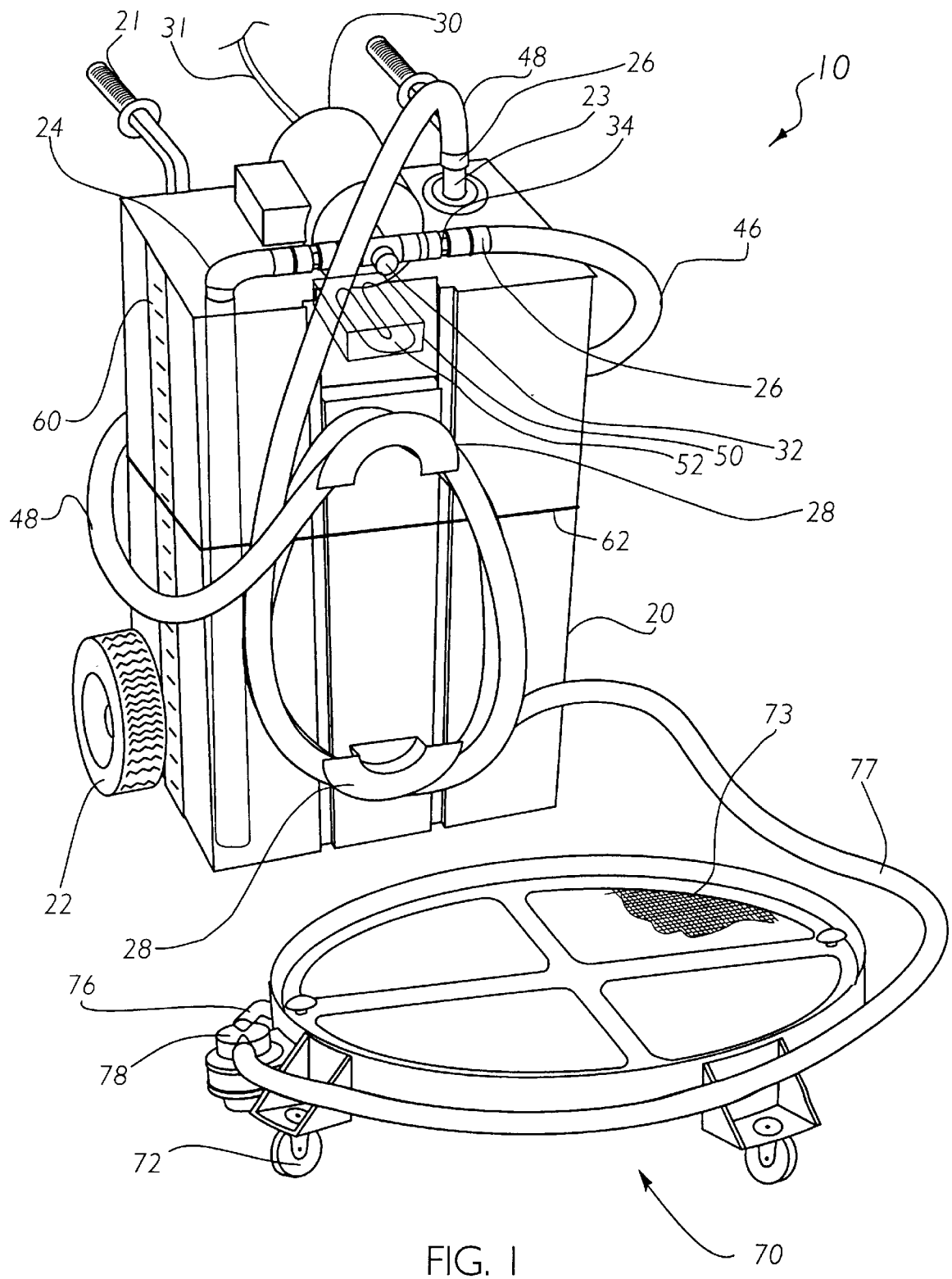
FIG. 1 is an upper perspective view of the present invention.

Turning now descriptively to the figures, in which similar reference characters denote similar elements throughout the several view, FIGS. 1 through 4 illustrate an oil changing system 10, which comprises a tank 20 for retaining a liquid such as oil, a pair of wheels 22 attached to the tank 20, a motor 30 connected to a pump 32, a pair of male couplers 34 attached to opposing sides of the pump 32, a first filter 42 and a second filter 44, a volume indicia 60 attached to the side of the tank 20, a cavity 50 within the tank 20 which contains a light 52, and a drain pan 70 fluidly connectable to the pump 32 by a drain hose 76. The user positions the drain pan 70 below the oil drain spout of the engine to receive the contaminated oil. The contaminated oil that is received by the drain pan 70 is then drawn by the pump 32 through the drain hose 76 where after the contaminated oil is dispersed through an unnumbered exhaust hose. The unnumbered exhaust hose may be connected to a pipe system within a building structure to drain the contaminated oil into a common reservoir.

As shown in FIGS. 1 through 4, the tank 20 is preferably rectangular shaped with an interior portion, however, one skilled in the art can appreciate that various other shapes will also be acceptable. The tank 20 is preferably constructed from semi-transparent plastic, but may be constructed from various other well-known materials.

Figure 3:
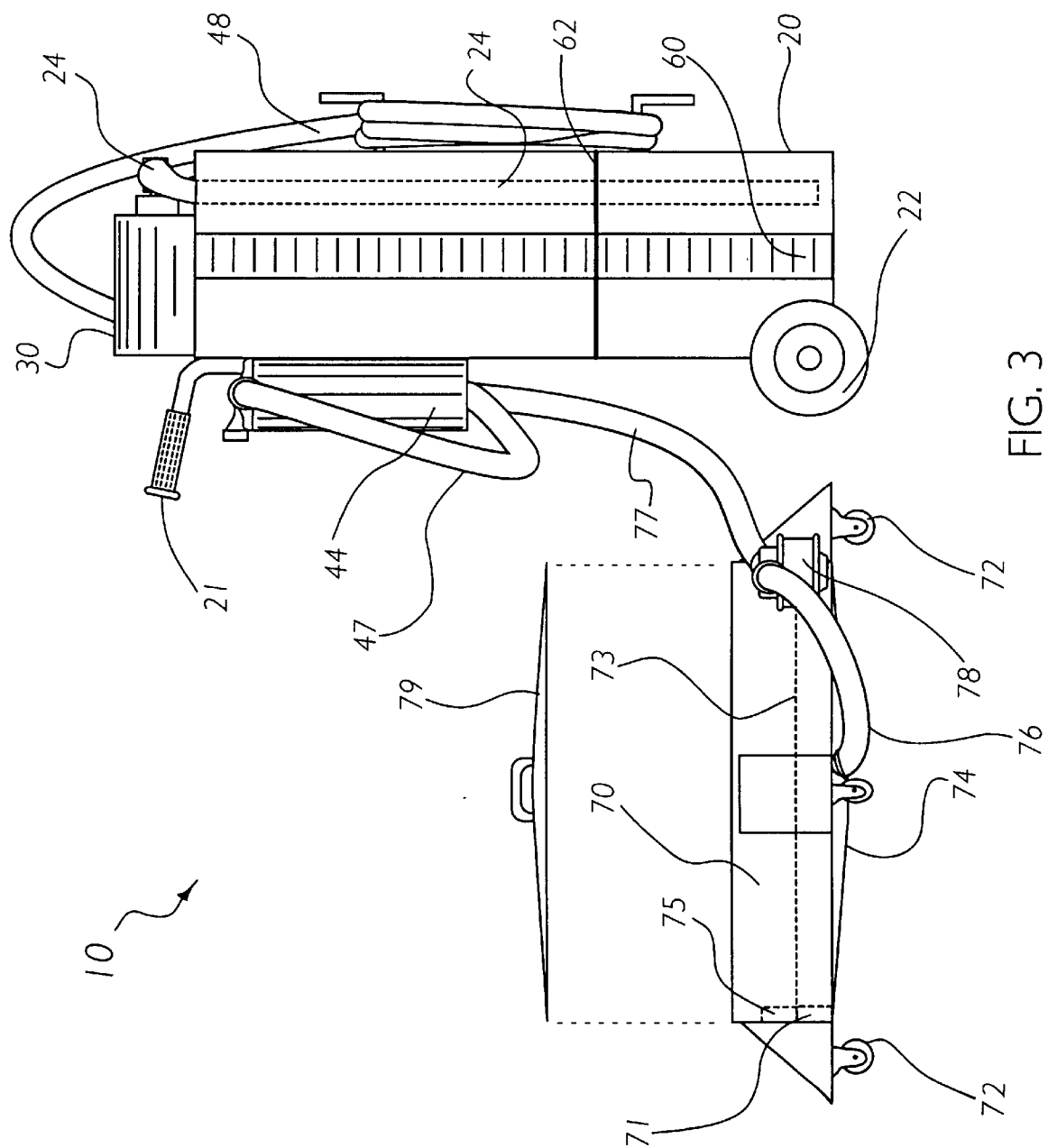
FIG. 3 is a side view of the present invention.

As best shown in FIGS. 1 and 3, the volume indicia 60 is attached to the side of the tank 20. The volume indicia 60 is a strip with cutout numbers and lines that represent the volume of liquid remaining within the tank 20, metric and/or standard. Other well-known devices may be utilized for measuring the level of liquid in the tank 20 such as exterior tubes or transparent material within the tank 20. A strap 62 is positioned around the peripheral of the tank 20 as best shown in FIGS. 1 and 3. The strap 62 is preferably comprised of an elastic material. The position of the elastic strap 62 notifies the user when to stop filling an engine or transmission with oil.

Figure 4:
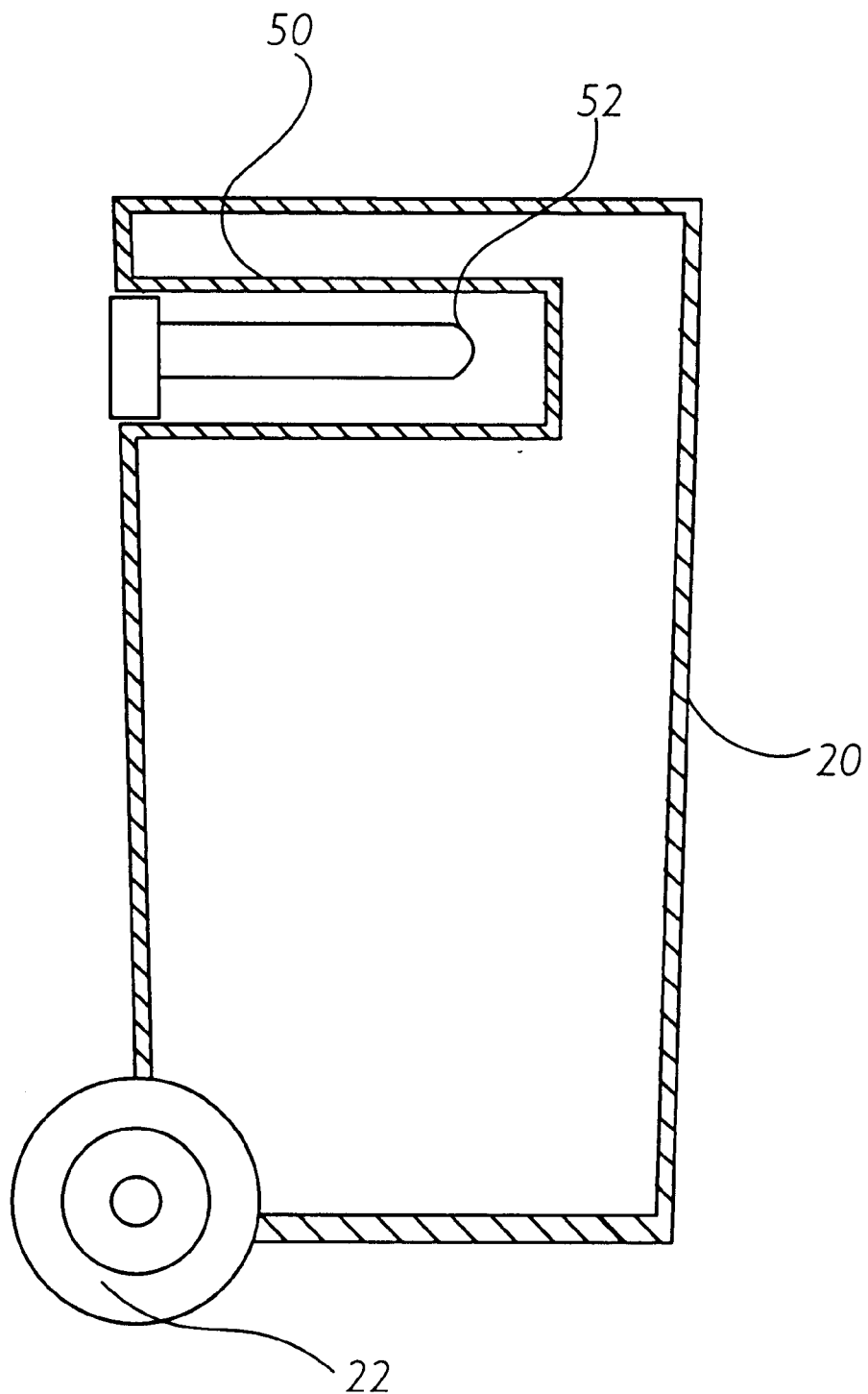
FIG. 4 is a cross sectional view taken along line 4—4 of FIG. 1.

A cavity 50 projects into the rear portion of the tank 20 as best shown in FIGS. 1 and 4. A light 52 is positioned within the cavity 50 as best shown in FIG. 4. The light 52 may be either incandescent or fluorescent. The light 52 emits light rays that project through the cavity 50 into the interior portion of the tank 20 to illuminate the tank 20. The level of the liquid within the tank 20 is shown to the exterior portion of the tank 20 since the liquid will capture a portion of the light rays making the tank 20 darker where the liquid is. This allows the user to easily visualize the level of the liquid within the tank 20 especially during darkness or shady periods of the day.

Figure 2:
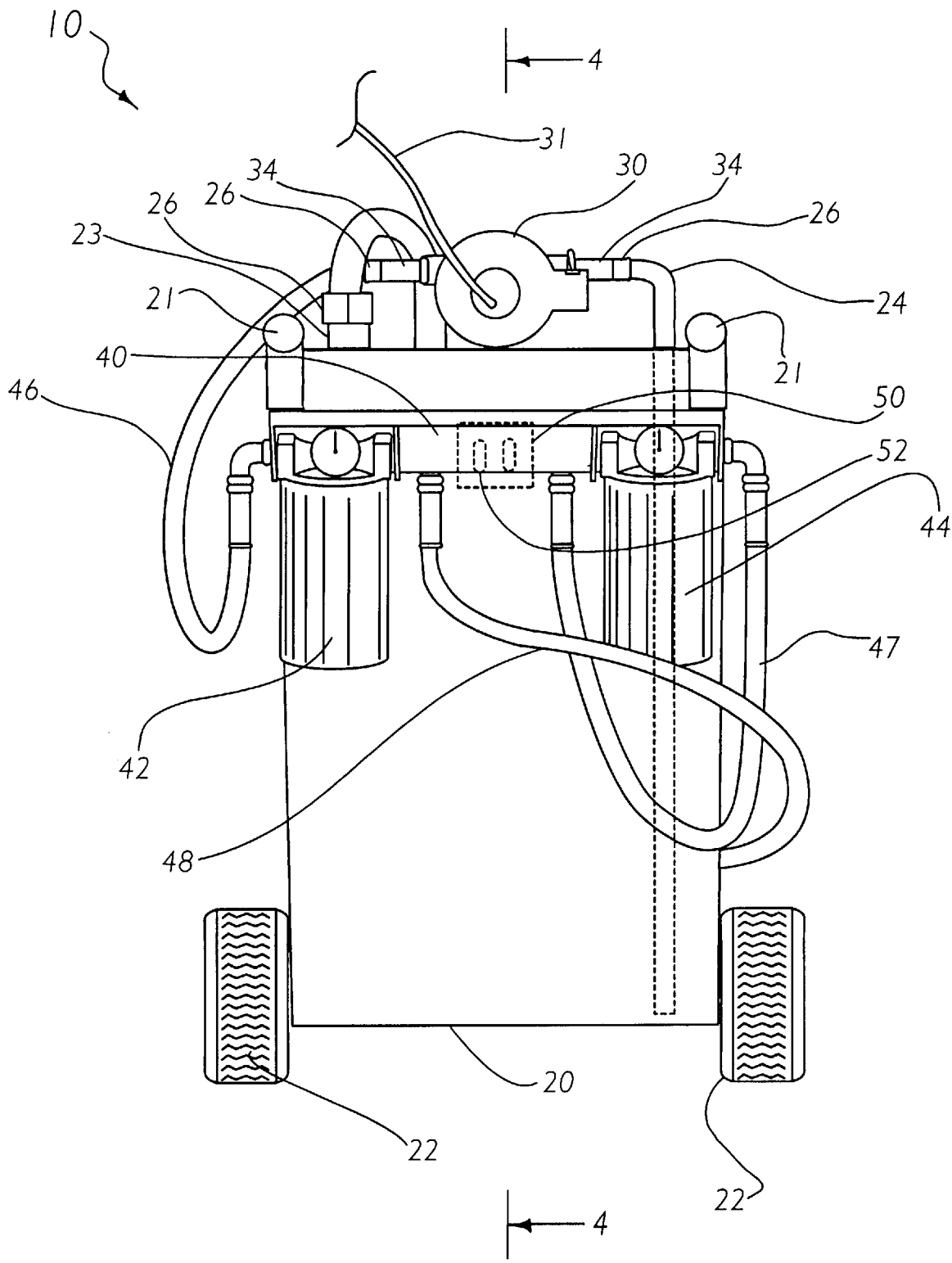
FIG. 2 is a rear view of the present invention.

As best shown in FIG. 2, the tank 20 preferably includes at least one pair of wheels 22 to allow convenient transporting of the tank 20, especially when filled with liquid. A pair of handles 21 are attached to the rear upper portion of the tank 20 to allow manual manipulation of the tank 20. The motor 30 is preferably secured to the upper surface of the tank 20 as shown in FIG. 1. A power cord 31 extends from the motor 30 as shown in FIGS. 1 and 2. The motor 30 may be electric or gas powered. The pump 32 is mechanically connected to the drive shaft of the motor 30 as shown in FIG. 1. The pump 32 preferably has a relatively small interior chamber for reducing the amount of oil retained within such as a gear pump. A pair of opposing male couplers 34 are attached to pump 32 as best shown in FIGS. 1 and 2.

As best shown in FIG. 1, an intake tube 24 projects downwardly into the tank 20. The distal end of the intake tube 24 has a female coupler 26 that is removably connectable to one of the male couplers 34 of the pump 32. The intake tube 24 allows the oil within the tank 20 to be drawn out through pump 32. The intake tube 24 and the female coupler 26 may be connected to either side of the pump 32 for filling the tank 20 with clean oil or for drawing clean oil from the tank 20.

As shown in FIG. 2, a rack 40 is attached to the rear portion of the tank 20 for retaining hoses and attachments. A first filter 42 is secured to the rack 40 wherein the first filter 42 preferably is 25 microns but may be of any filtration size. The first filter 42 is preferably a non-bypass filter so that contaminated oil cannot pass through even if the filter is plugged. The first filter 42 is removably attachable to the pump 32 by a first hose 46 that has a female coupler 26 at the distal end for removably coupling with a male coupler 34 of the pump 32. As shown in FIGS. 1 through 3, a second hose 48 is fluidly connected to the first filter 42 opposite of the first hose 46. The second hose 48 is of a substantial length and has a fill nozzle 23 attached to the distal end thereof. The fill nozzle 23 is inserted into a spout of an engine or transmission for filling the engine or transmission with oil pumped by the pump 32 from the tank 20. As shown in FIGS. 1 and 3, a hose bracket 28 is attached to the front portion of the tank 20 to provide storage of the second hose 48 during non-use. As shown in FIG. 1, the fill nozzle 23 is inserted into an aperture within the upper surface of the tank 20 during non-use. When the fill nozzle 23 is in use, an air filter 12 is inserted into the aperture to prevent debris from accidentally contaminating the clean oil within the tank 20. The aperture is also utilized to fill the tank 20 with oil, motor 30 or hydraulic.

As shown in FIG. 2, a second filter 44 is preferably attached to the rack 40 for filtering contaminated oil, such as hydraulic oil, for reuse. The second filter 44 is preferably 10 micron or greater and is non-bypass similar to the first filter 42. An auxiliary hose 47 is fluidly connected to the second filter 44 at one end and is removably connectable to the discharge end of the pump 32 as shown in FIG. 2. The second hose 48 can be fluidly connected to the second filter 44 opposite of the auxiliary hose 47 to allow discharge of the cleansed oil into a container or back into the hydraulic system of the tractor.

As shown in FIGS. 1 and 3, the drain pan 70 is substantially swaged and broad to collect oil from various heights of vehicles. The drain pan 70 is preferably circular in shape, but may be of any desirable shape. A support rim 71 along the sidewalls of the drain pan 70 supports a wire mesh 73. The wire mesh 73 filters sand, dirt and other large debris from the contaminated oil that is drained from the engine or transmission. A plurality of caster wheels 72 are attached to the bottom portion of the drain pan 70 to allow easy manipulation of the drain pan 70. A sealing rim 75 is attached to the periphery of the wire mesh 73 to seal the wire mesh 73 filter against the sidewalls of the drain pan 70, thereby preventing debris from falling along the sides of the wire mesh 73. As shown in FIG. 3, a cover 79 is removably attachable over the drain pan 70 to reduce contamination during non-use.

As shown in FIG. 3, the drain pan 70 has an inclined floor 74 that directs the contaminated oil toward an aperture within the drain pan 70. A drain hose 76 is connected to the aperture at one end and connected to a third filter 78 at the opposite end as shown in FIG. 3. The third filter 78 preferably has a filtration of 100 micron, but may be of any desirable size. A transporting hose 77 is connected to the third filter 78 as shown in FIGS. 1 and 3. The transporting hose 77 has a female coupler 26 that allows fluid connection to the male coupler 34 of the pump 32. The transporting hose 77 has to be of a shorter length to allow the pump 32 to draw viscous fluids through.

When using the present invention for draining contaminated oil from an engine or transmission, the user connects the transporting hose 77 to the drawing end of the pump 32. An unnumbered connecting hose is connected to the discharge end of the pump 32. The unnumbered connecting hose is then either attached to a pipe system within a building structure which will transport the oil into a common reservoir or the distal end is inserted into an empty container to fill with the contaminated oil. The drain pan 70 is positioned beneath the motor 30 or transmission to receive the discharged contaminated oil. The user then starts the motor 30 and opens the drain plug of the motor 30 or transmission. The discharged contaminated oil is collected by the drain pan 70 and drawn into the drain hose 76. The contaminated oil is then filtered through the third filter 78 and then is drawn through the transporting hose 77 into the pump 32. The contaminated oil is then pushed through the unnumbered connecting hose into the pipe system or the container.

When using the present invention for pumping clean oil from the tank 20 into a motor or transmission, the user connects the intake tube 24 to the drawing end of the pump 32 as shown in FIG. 1. The user then connects the first hose 46 to the discharge end of the pump 32. The user then inserts the fill nozzle 23 into the motor or transmission, and then inserts the air filter 12 into the aperture of the tank 20. The user positions the elastic strap 62 along the desired location of the volume indicia 60 which represents the oil level at which the user must stop the motor and pump 32 to fill the engine or transmission with the exact amount of oil. The user applies power to the motor 30 that draws the clean oil from the tank 20 into the intake tube 24. The clean oil is then pushed through the first hose 46 into the first filter 42 to remove any debris or impurities that may have remained within the pump 32 from using to remove contaminated oil. The filtered oil is then pushed through the second hose 48 through the fill nozzle 23 then into the motor or transmission. When the oil level within the tank 20 descends to the elastic strap 62, the user terminates power to the motor 30 and pump 32.

When using the present invention to clean contaminated hydraulic oil, the user attaches the transporting hose 77, or other hose which will draw the contaminated hydraulic oil, to the drawing end of the pump 32. The user then attaches the auxiliary hose 47 to the discharge end of the pump 32. The second hose 48 is attached to the third filter 78 opposite of the auxiliary hose 47. The user applies power to the motor 30 and pump 32 that draws the contaminated hydraulic oil through the transporting hose 77. The contaminated oil is pushed through the auxiliary hose 47 where it is filtered through the third filter 78. The filtered oil is then pushed through the second hose 48 where the fill nozzle 23 may disperse the oil either back into the transmission or into an appropriate container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil changing system comprising:
    a tank having an interior portion for retaining liquid;
    a pump means having a drawing end and a discharge end, wherein said pump means is attached and fluidly connectable to said tank;
    a first coupler attached to said drawing end operable for attaching to various hoses;
    a second coupler attached to said discharge end operable for attaching to various hoses;
    a drain pan fluidly connectable to said drawing end of said pump means; and
    a filtering means fluidly connectable to at least one end of said pump means by at least a first hose of said various hoses.

2. The oil changing system of claim 1, wherein said filtering means comprises at least one filter fluidly connectable to said discharge end of said pump means by a hose of said various hoses.

3. The oil changing system of claim 1, wherein said filtering means comprises a first filter connected to said first hose and a second filter fluidly connectable to said discharge end of said pump means by an auxiliary hose of said various hoses.

4. The oil changing system of claim 3, wherein said first filter and said second filter are comprised of non-bypass filters.

5. The oil changing system of claim 1, including a measuring means attached to said tank for informing an individual of the volume of liquid remaining within said tank.

6. The oil changing system of claim 5, wherein said measuring means comprises a swaged strip with a plurality of volume indicia thereupon.

7. The oil changing system of claim 6, including a strap movably positioned about a periphery of said tank.

8. The oil changing system of claim 1, including a light means within said tank for illuminating said interior portion of said tank.

9. The oil changing system of claim 8, wherein said light means comprises:
    a cavity within said tank; and
    a light positioned within said cavity.

10. The oil changing system of claim 1, wherein said tank is comprised of either a transparent or semi-transparent material.

* * * * *